DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 30, 1971

892 O.G. 1605

T892,023

PROCESS FOR NONMELT FORMING WEBS OF THERMOPLASTIC RESIN AND ARTICLE FORMED THEREBY

Kenneth W. Filbert, 6 Hilton, Hilton, and Peter J. Wayne, 731 Halstead Road, Sharpley, both of Wilmington, Del. 19803

Filed Apr. 10, 1970, Ser. No. 27,240
Int. Cl. B29f *3/00;* F16b *19/04*
U.S. Cl. 161—116
1 Sheet Drawing. 6 Pages Specification

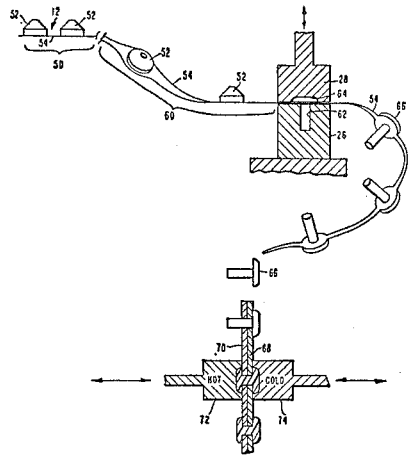

Thermoplastic resin is formed into a continuous patterned web which remains intact while passing through one or more stations where work, including nonmelt forming, is done on the web. For example, the web as formed comprises a strip of film having spaced preforms integrally molded to one surface thereof. At the first station, the web is longitudinally nonmelt drawn which increases the distance between the preforms but does not change their configuration because of their greater thickness. At the next station, the preforms are nonmelt formed into a rivet, and the film between rivets is trimmed in width if desired. At the final station, the web is broken down into discrete rivets which are nonmelt formed in fastening disposition through apertured sheet members. If the film of the web is retained between one or more pairs of rivets, the previously described nonmelt drawing of the web strengthens the film so that it can serve as a high strength tying element between rivets. Instead of rivets, the preforms can be utilized as-molded or as thereafter nonmelt formed or drawn to form other useful articles together with or apart from the as-molded or thereafter nonmelt drawn film portion of the web.

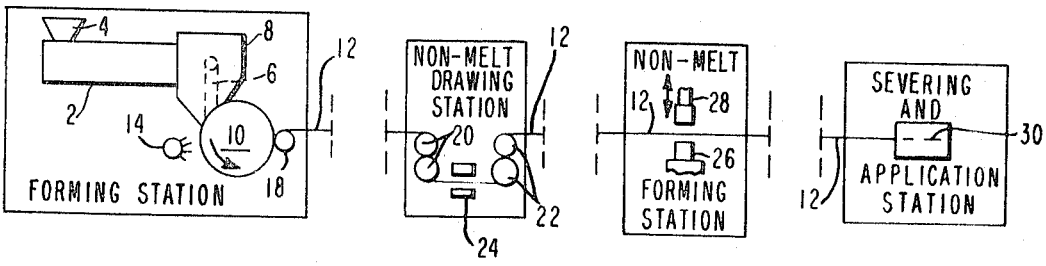

Nov. 30, 1971 K. W. FILBERT ET AL T892,023
PROCESS FOR NONMELT FORMING WEBS OF THERMOPLASTIC RESIN AND ARTICLE FORMED THEREBY
Filed April 10, 1970
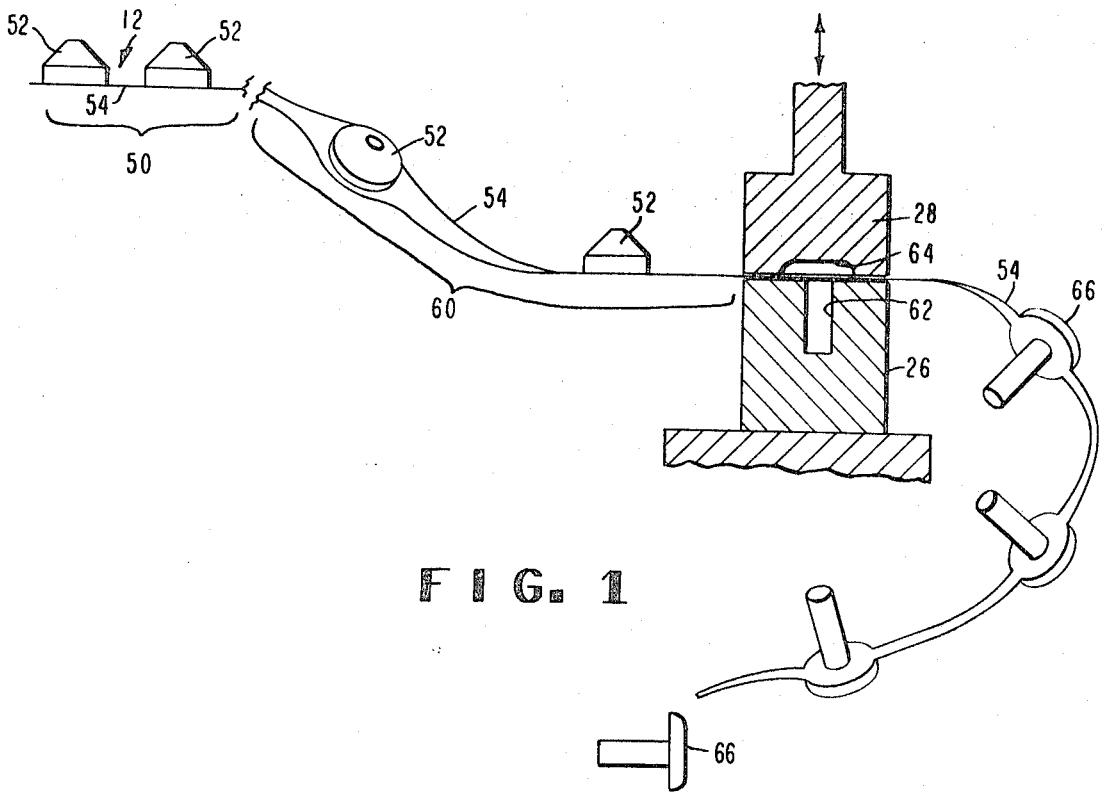
FIG. 1
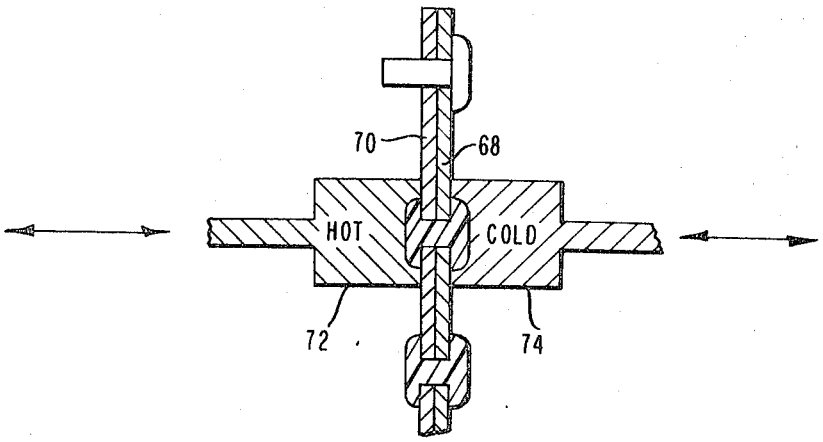
FIG. 2